United States Patent [19]
Chinniah et al.

[11] Patent Number: 5,692,827
[45] Date of Patent: Dec. 2, 1997

[54] TAIL LAMP FOR AN AUTOMOTIVE VEHICLE USING AN ELONGATED HYPERBOLIC CYLINDER

[75] Inventors: Jeyachandrabose Chinniah, Ann Arbor; Alfred Wasilewski, Northville; Balvantrai G. Patel, Rochester Hills, all of Mich.

[73] Assignee: Ford Motor Company, Dearborn, Mich.

[21] Appl. No.: 607,547

[22] Filed: Mar. 1, 1996

[51] Int. Cl.$^6$ .................................. F21V 5/00; F21V 5/04
[52] U.S. Cl. .................. 362/336; 362/61; 362/83.3; 362/80; 362/336; 362/337; 362/338; 362/340
[58] Field of Search .......................... 362/61, 336, 337, 362/338, 339, 340, 80.1, 83.3, 80, 800 223, 263; 315/246

[56] References Cited

U.S. PATENT DOCUMENTS

| | | | |
|---|---|---|---|
| 1,514,653 | 11/1924 | Cardwell | 362/336 |
| 1,942,136 | 1/1934 | Carter et al. | 362/337 |
| 1,960,148 | 5/1934 | Gage | 362/337 |
| 2,137,079 | 11/1938 | Falge | 362/336 |
| 2,762,912 | 9/1956 | Onksen et al. | 362/337 |
| 3,222,516 | 12/1965 | Miles | 362/338 |
| 3,739,169 | 6/1973 | Weinreich | 362/83.3 |
| 4,153,928 | 5/1979 | Speedy | 362/80 |
| 4,517,630 | 5/1985 | Dieffenbach et al. | 362/268 |
| 4,588,619 | 5/1986 | Fiscus et al. | 362/61 |
| 4,591,954 | 5/1986 | Kawamura et al. | 362/61 |
| 4,722,023 | 1/1988 | Arima et al. | 362/80 |
| 4,733,335 | 3/1988 | Serizawa et al. | 362/800 |
| 4,868,725 | 9/1989 | Sakagawa et al. | 362/231 |
| 4,935,665 | 6/1990 | Murata | 313/500 |
| 4,951,179 | 8/1990 | Machida | 362/61 |
| 5,038,255 | 8/1991 | Nishihashi et al. | 362/800 |
| 5,174,649 | 12/1992 | Alston | 362/244 |
| 5,217,290 | 6/1993 | Windross | 362/32 |
| 5,333,071 | 7/1994 | Ishikawa et al. | 362/80.1 |
| 5,347,435 | 9/1994 | Smith et al. | 362/80.1 |
| 5,365,412 | 11/1994 | Koppolu et al. | 362/61 |
| 5,438,487 | 8/1995 | Schmid et al. | 362/800 |
| 5,442,526 | 8/1995 | Stowe, Jr. | 362/263 |
| 5,471,371 | 11/1995 | Koppolu et al. | 362/800 |
| 5,515,253 | 5/1996 | Sjobom | 362/339 |
| 5,528,474 | 6/1996 | Roney et al. | 362/800 |
| 5,565,741 | 10/1996 | Jennato et al. | 315/246 |
| 5,610,472 | 3/1997 | Schmitt, Jr. | 362/223 |

*Primary Examiner*—Ira S. Lazarus
*Assistant Examiner*—Matthew Spark
*Attorney, Agent, or Firm*—Daniel M. Stock

[57] ABSTRACT

A rear lighting system includes an elongated light source emitting light and a solid lens having an inner surface comprised of a hyperbolic cylinder, said hyperbolic cylinder having a first focal line and a second focal line and a cylinder length. The first focal line is coincident with the light source and the outer surface is comprised of a generally planar shape perpendicular to the horizontal plane and the vertical plane.

8 Claims, 1 Drawing Sheet

TAIL LAMP FOR AN AUTOMOTIVE VEHICLE USING AN ELONGATED HYPERBOLIC CYLINDER

RELATED APPLICATIONS

The present invention is related to commonly assigned concurrently filed applications (attorney docket [95-0586] Ser. No. 08/607,545 and Ser. No. 08/607,546[96-0139]).

BACKGROUND OF THE INVENTION

The present invention relates to a rear lighting system for an automotive vehicle and, more specifically, to an improved rear lighting system having a relatively small depth.

Conventional rear lighting use a reflector and an incandescent bulb to illuminate the rear colored light diffuser. Such systems are, however, very wide. Since space in automotive vehicles is a premium, reduction in depth is generally desirable goal.

Aesthetics are also important in rear lights. Typically incandescent bulbs lose their strength as the distance from the light source increases. This is not particularly aesthetically pleasing.

It would therefore be advantageous to provide a lighting system that has a relatively small package depth height while providing a uniform distribution of light across the lens.

SUMMARY OF THE INVENTION

One advantage of the present invention is that a uniform light distribution is achieved across the lens of the system.

The present invention includes an elongated light source emitting light and a solid lens having an inner hyperbolic surface, said hyperbolic surface having a focal line and a surface length. The focal line is coincident with the light source and the outer surface is comprised of a generally planar shape perpendicular to the horizontal plane and the vertical plane.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
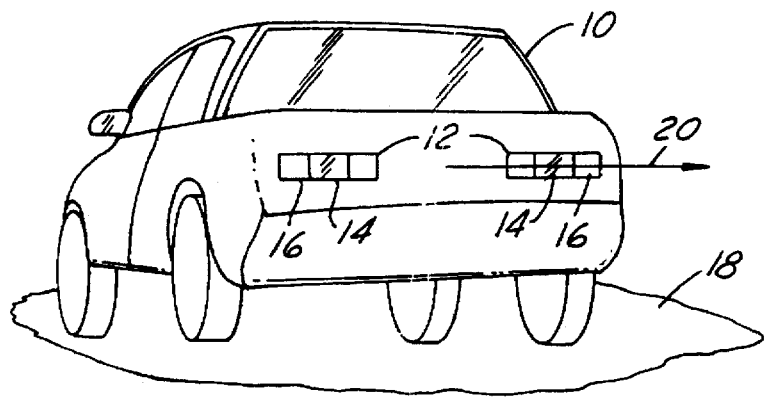
FIG. 1 is perspective view of an automotive vehicle having a tail lamp using a lighting system of the present invention.

Referring to FIG. 1 a rear view of an automotive vehicle 10 is shown. The rearward lighting of a vehicle generally comprises reverse lights 12, turn signals 14 and marker lights 16. The lighting system described below may be used for any one of such applications.

Figure 2:
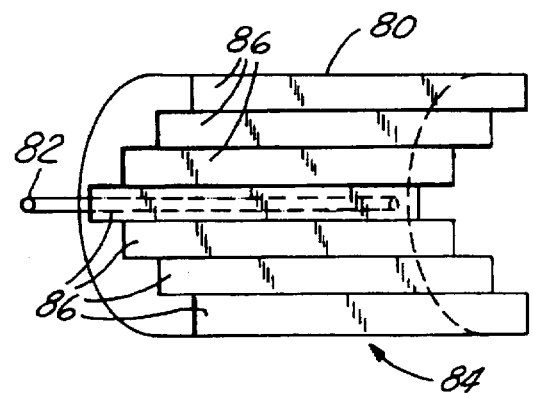
FIG. 2 a perspective view of a single hyperbolic surface lens.

Referring now to FIGS. 1 and 2, a lens 80 having a single hyperbolic surface is shown. In such an application it is preferable to use a linear light source 82 extending substantially the length of lens 80. Examples of linear light sources are neon lights and a row of light emitting diodes. Uniformity of light emitted along the length of light source 82 is preferred.

Hyperbolic lens 80 has an outer surface 84 that is preferably planar. The plane of the outer surface is preferably perpendicular to the plane 18 of the road and to the horizontal axis 20 of vehicle 10. To facilitate manufacturing, lens 80 can be made thinner by providing a series of planar stepped surfaces 86 that have essentially no effect on the optics of the lens. A thinner lens is easier to manufacture.

Figure 3:
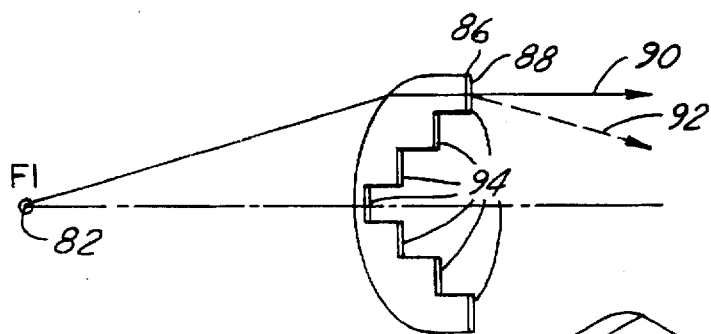
FIG. 3 is a perspective view of a hyperbolic lens having fluted stepped surfaces.

Referring now to FIG. 3, a cross-sectional view of a single hyperbolic surface lens is shown. A hyperbola is generally two curves, however, in this case only one curve is used. Linear light source 82 is preferably located at the point F1, i.e., at the focal point of the unused hyperbola. The point F1 corresponds to the focal line of the hyperbola of the hyperbolic surface.

To alter the light ray 90 to a modified light ray 92 a holographic film 94 may be placed on planar stepped surfaces. One example of a holographic film is manufactured by Polaroid. Holographic film 94 contains light manipulators to refract the light passing through film 94.

Figure 4:
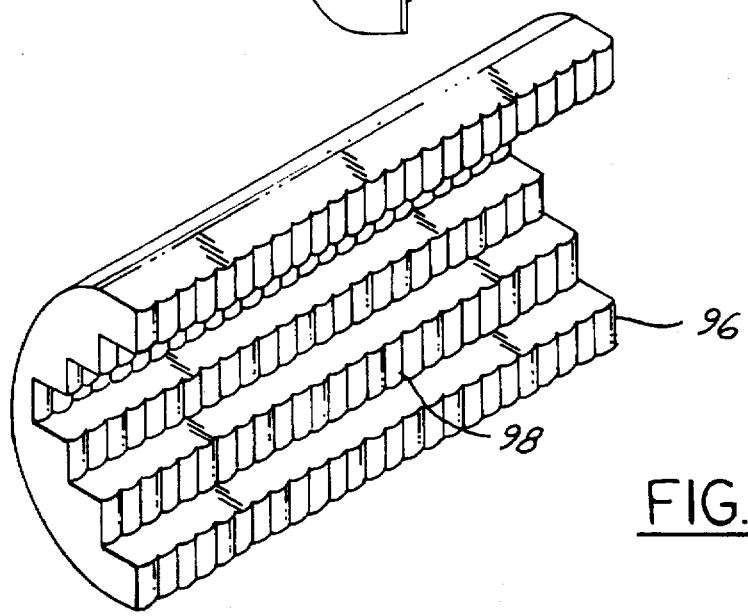
FIG. 4 is a cross section of a hyperbolic lens having holographic film on its planar surfaces.

Referring now to FIG. 4, an alternative way to modify the light through hyperbolic lens 80 is to provide fluting 96 on the outside of hyperbolic lens 80. Fluting 96 may be integrally formed on planar stepped surfaces 86. Fluting 96 may also be separate from hyperbolic lens 80. Fluting 96 may be comprised of cylinders having different radii. For example, flutes having radii between 5 and 9 mm may be used in automotive lighting applications. The cylinders may be parallel to planar stepped surfaces 86. The size and orientation of fluting 96 depend on the desired light output. As an example the widths of the cylinders may be about 10 mm and protrude from the surface about 1 to 4 mm depending on the radius of the individual flute. To help redirect the light rays flutes may be offset from the stepped surface by a wedge angle in the horizontal or vertical direction.

Fluting 96 may be used to modify the light through lens by spreading the light in a horizontal direction. Fluting 96 for such an application may be fluting using vertical cylinders 98. Vertical cylinder fluting is particularly useful in reverse lamp applications.

Various modifications will be apparent to those skilled in the art. For example, different applications such as some forward light applications may be easily employed using the teachings provided herein. All such modifications would be within the scope of this invention.

What is claimed is:

1. A lighting system for an automotive vehicle having a front portion, a rear portion, a horizontal plane and a vertical plane perpendicular to said horizontal plane and parallel to the longitudinal axis of said vehicle, said lighting system comprising:

an elongated light source emitting light and mounted within the rear portion of the vehicle; and an elongated solid lens, longitudinally rearward of the elongated light source, having an inner, light source facing, hyperbolic surface with a curvature toward the light source, the inner surface having a focal line coincident with said light source, and an outward facing surface with a plurality of planar stepped surfaces, positioned to decrease a thickness of the solid lens, perpendicular to said horizontal plane and said vertical plane.

2. A lighting system as recited in claim 1 wherein said outer surface has fluting formed on said planar stepped surfaces for redirecting light.

3. A lighting system as recited in claim 1 wherein said outer surface has holographic film formed on said planar stepped surfaces for redirecting light.

4. A lighting system as recited in claim 1 wherein said light source has a generally uniform distribution of light over its length.

5. A lighting system as recited in claim 1 wherein said fluting formed of cylinders having predetermined radii.

6. A lighting system as recited in claim 4 wherein said light source is a neon tube.

7. A lighting system as recited in claim 4 wherein said light source is a row of light emitting diodes.

8. A lighting system for an automotive vehicle having a front portion, a rear portion, a horizontal plane and a vertical plane perpendicular to said horizontal plane and parallel to the longitudinal axis of said vehicle, said lighting system comprising:

an elongated light source emitting light and mounted within the rear portion of the vehicle; and an elongated solid lens, longitudinally rearward of the elongated light source, having an inner, light source facing, hyperbolic surface with a curvature toward the light source, the inner surface having a focal line coincident with said elongated light source and an outward facing surface with a plurality of generally planar stepped surfaces with fluting disposed thereon so as to provide a small package depth while providing a uniform light distribution.

* * * * *